Feb. 27, 1951 C. H. VAN HARTESVELDT 2,543,514
SUPPLEMENTARY FUEL
Filed Jan. 10, 1948

Inventor
CARROLL H. VAN HARTESVELDT

Patented Feb. 27, 1951

2,543,514

UNITED STATES PATENT OFFICE 2,543,514

SUPPLEMENTARY FUEL

Carroll H. Van Hartesveldt, Rosemont, Pa., assignor to Thompson Products, Inc., Cleveland, Ohio, a corporation of Ohio Application January 10, 1948, Serial No. 1,563

3 Claims. (Cl. 44—53)

The present invention relates to supplementary fuels for internal combustion spark engines which materially increase the octane rating or anti-detonant capacity of standard engine fuels, such as gasoline, decrease tendency for autoignition of such standard fuels and hinder formation of deleterious deposits in the engine.

More particularly, the present invention relates to supplementary spark engine fuels composed of alkyl phosphates or phosphites in combination with monohydric alcohols, water and anti-detonants such as tetraethyl lead, monomethyl aniline, and the like.

Heretofore, the anti-detonant properties of main fuel, such as gasoline, for use in internal combustion engines have been improved by the blending of anti-detonants such as tetraethyl lead into the fuel. Autoignition caused by combustion chamber deposits from leaded gasoline has been decreased by incorporating in the fuel, compounds such as trimethyl phosphate and trimethyl phosphite. The blended gasoline containing the anti-detonant and anti-autoignition compounds is continuously fed to the engine during all conditions of engine operation, although the use of the expensive anti-detonant and the phosphorus compound is seldom required in internal combustion engines under normal engine operating conditions. This continuous use of a blended fuel under all operating conditions has resulted in a considerable waste of the relatively expensive anti-detonant and, in the case of tetraethyl lead, in the formation of deleterious lead oxide deposits within the engine.

The present invention now provides a supplementary fuel for injection into an internal combustion spark engine only when the engine is operating under detonating conditions. The supplementary fuel of the present invention contains alkyl phosphates or phosphites, monohydric alcohols, water, and preferably small amounts of additional anti-detonants such as tetraethyl lead, monomethyl aniline, iron or nickel carbonyls, glycols, benzene, phenols, xylidine and its homologues, and the like. A metering unit or injector is employed to introduce these supplementary fuels into the main fuel-air mixture, the supplementary fuels being fed to the engine in properly metered amounts. The metering unit or injector is preferably automatically controlled by the throttle valve setting of the engine. Since the engine intake manifold pressure is determined by the throttle valve setting, the metering unit or injector may be actuated by the manifold pressure.

The formation of deleterious deposits in the engine during the use of the supplementary fuels of this invention is held to a minimum because of the small proportion of ash forming ingredients which are present in the supplementary fuel, and because of the injection of the ash forming ingredients into the engine in combination with alcohol and water which prevents adherence of the ash material to the engine surfaces. Inasmuch as the anti-detonants are introduced into the engine only when necessary, and then only in metered quantities which are just sufficient to offset deleterious engine combustion conditions, the amount of ash-producing material introduced into the engine will be quite negligible as compared with the quantities before involved in the use of blended main fuels. Further, due to the use of the alkyl phosphates or phosphites, the small amount of ash which is formed in the engine will not cause autoignition.

It has been found that trimethyl phosphate and trimethyl phosphite are particularly desirable alkyl phosphates or phosphites for use in the supplementary fuel of the present invention, inasmuch as the anti-knock value of the anti-detonant is relatively unaffected by the presence of these additives which at the same time effectively prevent autoignition from lead oxides formed from tetraethyl lead in either the supplementary or main engine fuel.

Suitable organic halides or other materials may be employed in the supplementary fuels of the instant invention. Since the organic halides and other materials are corrosive to common metals used in the construction of supplementary fuel tanks and injector units or metering devices such as those employed in the present invention, soluble oils may be employed to prevent this corrosion and also to prevent the precipitation of slimes or other deposits from the alcohol and water in the fuel.

The supplementary fuels of the present invention do not cause excessive temporary enrichment of the fuel charge to the engine since they are introduced separately into the main power fuel and air mixture which is fed to the engine only when needed. The supplementary fuels are therefore blended so as to have minimum enrichment properties which may be consistent with other requirements.

It is therefore an important object of the present invention to provide a supplementary fuel for internal combustion spark engines which is composed of an alkyl phosphate or phosphite, one or more monohydric alcohols, water, and smaller amounts of anti-detonants.

It is another object of the present invention to provide a supplementary fuel for periodic injection into an internal combustion engine which is composed of an alkyl phosphate or phosphite, a monohydric alcohol, water, and an anti-detonant in order to increase the anti-knock quality of a hydrocarbon fuel-air charge and to suppress the occurrence of autoignition.

It is a still further important object of the present invention to provide a supplementary fuel for internal combustion spark engines which contains trimethyl phosphate or trimethyl phosphite to prevent autoignition of the main fuel charge by the vigorous oxidation of combustion chamber deposits formed by the use of anti-detonants in the supplementary fuel, or in the main fuel.

It is a more specific object of the present invention to provide a supplementary fuel composed of trimethyl phosphites or trimethyl phosphates, water, tetraethyl lead, and sufficient monohydric alcohol to hold the tetraethyl lead in solution.

Other and further objects of the present invention will be apparent to those skilled in the art from the following detailed description of the annexed sheet of drawings, which shows suitable apparatus for injecting the supplemental fuels of the present invention into an internal combustion engine in accordance with the teachings of this invention.

Figure 1:
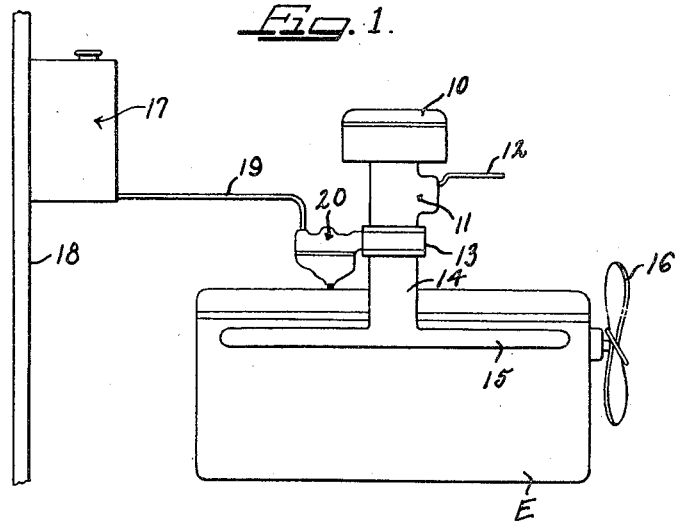
Figure 1 is a diagrammatic side elevational view of an internal combustion engine and fuel intake assembly equipped with a supplementary fuel injector or metering device for supplying supplementary fuel of this invention to the intake manifold of the engine.

In Figure 1 a high compression internal combustion engine E is equipped with the customary air and fuel-charging assembly including an air cleaner 10, a carburetor 11 receiving air from the cleaner 10, and a main fuel from a feed line 12. A mounting block 13 is interposed between the carburetor 11 and the inlet 14 of the intake manifold 15 for the engine E. Atomized fuel and air from the carburetor 11 passes through the block 13 to the inlet 14 and is distributed by the manifold 15 to the cylinders of the engine. A fan 16 is provided on the engine E as is conventional in automotive engines.

Figure 2:
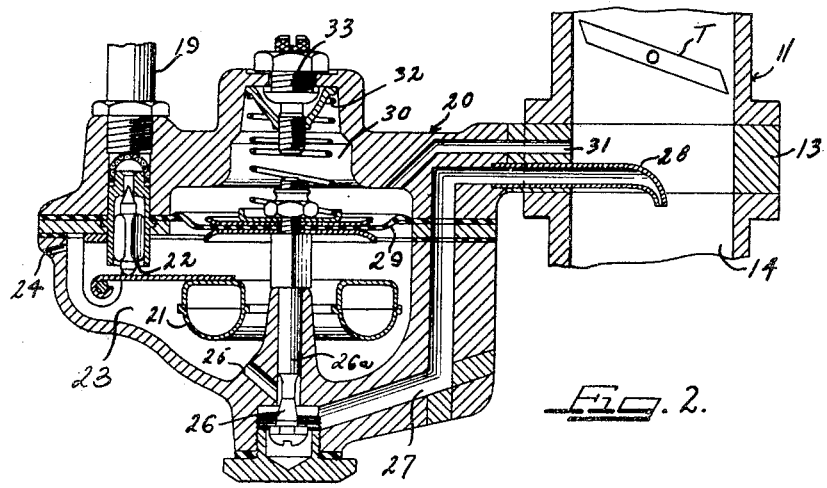
Figure 2 is a vertical cross-sectional view, with parts in elevation, of the fuel injector or metering device used for supplying the supplementary fuel of this invention to the engine when needed and then only in the required amounts.

A relatively small tank 17 for supplementary anti-detonant fuel is mounted on the fire wall 18 of the vehicle driven by the engine E. Supplementary anti-detonant fuel, such as a mixture of alcohol and water, preferably composed of alkyl phosphate or phosphite, monohydric alcohol, water, tetraethyl lead, and the required halides present in commercial tetraethyl lead, is fed from the tank 17 through a feed line 19 to a metering device 20 mounted on the block 13. This metering device is best shown in Figure 2 and includes a float 21 controlling an inlet valve 22 receiving the supplementary fuel from the tube or pipe 19. The float 21 is mounted in a float chamber 23 which receives the fuel from the inlet valve 22. The float chamber 23 is vented to the atmosphere at 24 and fuel under atmospheric pressure in the float chamber flows through a passage 25 to a diaphram-controlled metering valve 26 and thence through a passageway 27 to a nozzle 28 carried by the block 13 and opening downstream in the inlet 14.

The metering valve 26 has a stem portion 26a slidably mounted in a boss provided by the float chamber-defining casing. The upper end of the stem is connected to a diaphragm 29 which separates the float chamber 23 from a spring chamber 30. The spring chamber 30 is vented by a passageway 31 to the interior of the block 13 so that the spring chamber is under the influence of the vacuum existing in the inlet 14 for the engine E. A spring 32 is mounted in the spring chamber 30 and is adjusted by means of adjusting mechanism 33 to exert a downward pressure on the diaphragm 29 tending to open the metering valve 26. As vacuum builds up in the engine inlet 14, the chamber 30 is evacuated and its diaphragm 29 is raised against spring pressure to move the metering valve toward closed position.

Since the supplementary fuel or anti-detonant need only be fed to the engine during those periods of operation when detonation may occur, and since such periods of engine operation are accompanied by decreased vacuum or increased pressure in the inlet 14, the spring 32 is effective to move the metering valve 26 toward open position, because the vacuum in the chamber 30 is insufficient to overcome the spring pressure. Supplementary fuel is thereupon injected in amounts determined by the opening of the metering valve. The fuel is discharged through the nozzle 28 and commingles with the atomized gasoline and air mix in the inlet 14. The nozzle 28 has its discharge orifice facing downstream and the supplementary fuel is intimately admixed in fine spray form with the main fuel and air mixture. As the intake manifold pressure decreases to increase the vacuum in the chamber 30, likelihood of detonation in the engine decreases and the diaphragm 29 will pull the metering valve to closed or substantially closed position.

The main fuel and air feed is controlled by a throttle T as shown in Figure 2 and intake vacuum is the function of the degree of opening of this throttle. Thus, when the throttle is substantially closed, the intake vacuum is high, and when the throttle is substantially open, the intake vacuum is low. Therefore, supplemental fuel is introduced under full throttle conditions, and, instead of using an intake manifold pressure-actuated diaphragm, such as 29, the operation of the metering valve 26 can be actuated by a linkage arrangement with the throttle valve. The main fuel fed to the carburetor 11 can be a conventional gasoline having a low or medium octane number. This main gasoline will be free from expensive anti-detonants such as tetraethyl lead, or, if desired, can contain smaller amounts of such anti-detonants than were heretofore deemed necessary. The anti-detonant deficiency of the main fuel is entirely offset by the supplemental fuel of this invention.

In general, the supplemental fuels of the present invention are composed of trialkyl phosphate or phosphite, such as trimethyl phosphate or trimethyl phosphite, in combination with one or more monohydric alcohols and water with minor amounts of additional anti-detonants such as metallo-organic compounds, aromatic hydrocarbons, anilines, phenols, glycols, and the like, and, if desired, very small amounts of a corrosion-preventing dispersant to nullify the corrosion effect of the fuels on common metals and to prevent formation of slime deposits.

The selected anti-detonant for use in the supplementary fuels of the present invention must be soluble in the alcohols in proportions sufficient to produce the desired anti-knock effect. Anti-detonants such as phenols, glycols, anilines, and aromatic hydrocarbons are not as potent as tetraethyl lead and must be used in larger amounts ranging from about 5 to 10% by volume of the supplementary fuel. Tetraethyl lead is the preferred anti-detonant and is used in quantities varying from 0.1 to 15 cc. per gallon of supplementary fuel either with or without the other less potent anti-detonants.

I have found that monohydric alcohols preferably containing from 1 to 5 carbon atoms may be employed in the supplementary fuels of the present invention. The alcohols are employed to hold the anti-detonant in solution in the supplementary fuel.

The supplementary fuels of this invention also preferably contain water in amounts which are insufficient to precipitate the anti-detonant out of solution. The water content thus varies with the selected alcohol as well as with the selected anti-detonant. The amount of water present in the above-specified range of non-metallic anti-detonants in amounts ranging from 5 to 65% by volume. The alcoholic content in such a blend may vary from 30 to 90% by volume.

In order to maintain the commercial tetraethyl lead in solution in the supplementary fuels of this invention, it is necessary that the fuels contain sufficient monohydric alcohol. At present, the Federal health laws of the United States limit the maximum concentration of tetraethyl lead in gasoline for certain uses to 3 cc. per gallon of gasoline, because the tetraethyl lead is quite toxic. The following table shows the minimum alcohol content required for fuels containing various monohydric alcohols and 3 cc. of tetraethyl lead per gallon:

| Supplemental Fuel | Minimum Alcohol Content for Solubility of 3 cc. of Tetraethyl Lead per Gallon. |
| --- | --- |
|  | Per Cent |
| Methanol—Water | 73.5 |
| Ethanol—Water | 55.1 |
| Isopropanol—Water | 38.5 |

With higher concentrations of the alcohols the tetraethyl lead solubility increases rapidly. For example, a supplemental fuel composed of 75% methanol and 25% water will dissolve 10.35 cc. of tetraethyl lead per gallon.

Since the higher molecular weight alcohols, such as isopropanol, will hold the tetraethyl lead in solution with a higher proportion of water than the lower molecular weight alcohols, these higher molecular weight alcohols can be used as blending agents with methanol or ethanol to increase the permissible amounts of water in a solution which will dissolve 3 cc. of tetraethyl lead per gallon. For example, a solution containing methanol, isopropanol, and water will dissolve 3 cc. of tetraethyl lead per gallon with less total alcohol than if methanol were used alone. The organic anti-detonant compounds disclosed herein can also be used to enhance the solubility of tetraethyl lead in water solutions.

The trialkyl phosphates or phosphites, and particularly trimethyl phosphate and trimethyl phosphite, are present in the supplemental fuels of the present invention to prevent autoignition which may be caused by the incandescent particles of the combustion chamber deposits which may be undergoing oxidation during the compression of the main body of the fuel in the engine. The incandescence of these particles, either on the combustion chamber walls or in the gaseous phase, will ignite the fuel-air mixture which is injected into the motor in advance of the electric spark at the spark plug. The tendency of autoignition of the gasoline vapors in spark ignition engines is reduced or suppressed by the presence of the trialkyl phosphates in the supplemental fuel of the present invention. The trialkyl phosphates and phosphites, and in particular the trimethyl derivatives, have very little effect upon the anti-knock value of anti-detonants such as tetraethyl lead, but appear to have a specific action upon the lead deposits which prevent autoignition.

Trimethyl phosphate and trimethyl phosphite are soluble in water, methanol, ethanol and isopropanol. Inasmuch as trimethyl phosphate and trimethyl phosphite are both soluble in the above described mixtures of the alcohols and water it is not necessary to provide an additional dispersing agent for these phosphorus compounds. I have found that relatively small amounts of the phosphorus compounds are extremely effective in reducing the autoignition caused by the lead deposits. I have found that trimethyl phosphate and trimethyl phosphite when present in amounts from 0.1 to 15 cc. per gallon of supplemental fuel is sufficient to suppress autoignition due to the presence of the lead deposits. It is preferred that the trimethyl phosphate and trimethyl phosphite be present in amounts approximately equal to the amounts of tetraethyl lead present in the supplemental fuel.

By injecting the supplementary fuel containing tetraethyl lead only when the engine requires it, the use of tetraethyl lead is minimized and the possibility of lead deposit formation in the engine are also minimized. By the injection of the tetraethyl lead in combination with water and alcohol, the adherence of lead oxides to the spark plugs and combustion chamber surfaces is prevented. Further, that small amount of deposit which may accumulate within the combustion chamber is not effective in producing autoignition due to the presence of trimethyl phosphate or trimethyl phosphite in the supplementary fuel. In cases where tetraethyl lead is used only in the main fuel, the phosphates or phosphites are also effective in preventing autoignition from the products of combustion of the lead.

Small amounts of corrosion preventatives or dispersants may be added to the supplementary fuel of the present invention to prevent corrosion of the metal tanks and metering devices by decomposition products formed by hydrolysis, oxidation or other reactions of the ingredients, such as organic halides, of the supplementary fuel. I have found that emulsified petroleum oils containing aromatic organic sulphonates and soap are suitable additives for corrosion prevention and dispersion. Combinations of a specific dispersant such as a fatty alcohol sulphonate may be used in combination with corrosion inhibitors such as borax, sodium dichromate, and the like.

The use of the supplemental fuel of the present invention does not require deriching attachments or the like for the main fuel carburetor, since the supplemental fuels contain a minimum amount of combustible material per octane number improvement gained thereby. The water contents of the supplementary fuels, of course, have no fuel value. The combustible fuel value of the alcohols increases with the number of carbon atoms per alcohol molecule.

From the standpoint of good distribution and complete evaporation and mixing in the intake manifold of the engine, the supplemental fuel should be as volatile as possible without, however, being sufficiently volatile to vaporize in the supplemental fuel tank 17 or the injector metering device 20. The supplemental fuel should be so blended that it does not volatilize sufficiently to cause vapor lock temperatures which may be encountered in actual engine operation. Inasmuch as these temperatures may be as high as 150 to 180° F., I prefer to employ a mixture of lower and higher boiling alcohols with water to obtain the best compromise between evaporation in the intake manifold and freedom from vapor lock. Seasonal temperature changes may affect the temperature to which the supplemental fuel is subjected before it is injected into the engine and the blends may vary in accordance with such seasonal changes.

The preferred supplementary fuels of this invention contain, by volume, 50 to 90% of lower molecular weight monohydric alcohols, and 50 to 10% water, to which may be added 0.1 to 15 cc. of tetraethyl lead per gallon, 0.1 to 15 cc. trimethyl phosphate or trimethyl phosphite per gallon and, if desired, 0.1 to 1% corrosion-preventing dispersion. Three (3) to six (6) ccs. per gallon of tetraethyl lead are preferred. Specific examples of such preferred supplementary fuels are as follows:

1. 73.5% methanol
   26.5% water
   3 cc. tetraethyl lead per gallon
   3 cc. trimethyl phosphate
2. 73.5% methanol
   26.5% water
   1.5 cc. tetraethyl lead per gallon
   1.5 cc. trimethyl phosphate per gallon
3. 42.5% methanol
   42.5% isopropanol
   15.0% water
   3 cc. per gallon tetraethyl lead
   3 cc. per gallon trimethyl phosphate
   0.25–1.0% petroleum oil containing petroleum sulphonates and soap
4. 85% methanol
   15% water
   3 cc. per gallon tetraethyl lead
   3 cc. per gallon trimethyl phosphite
   0.25–1.0% petroleum oil containing petroleum sulphonates and soap It should be understood that the supplementary fuels of this invention are designed primarily to provide the main power fuel-air charge with the desired anti-knock properties. Further, since these supplementary fuels are fed into the main fuel-air charge only when the engine is operating under detonating conditions, and then only in amounts sufficient to stop the detonation, performance superior to that obtained by the use of blended gasoline containing tetraethyl lead may be obtained by the use of the supplemental fuels of the present invention. Also, since the anti-detonant is not being continuously injected into the engine manifold, less lead deposits are formed by the use of supplemental fuels of the present invention and the autoignition caused by such lead deposits during the use of conventional leaded gasolines is avoided by the presence of trialkyl phosphates or phosphites in the supplementary fuel of the present invention. Thus, it may be seen that I have provided an improved supplemental fuel by means of which an internal combustion engine may be supplied with high octane fuel when needed with greater economy due to the injection of the supplementary fuel into the intake manifold only when needed, and, due to the presence of trialkyl phosphates and phosphites, autoignition of the main fuel by the presence of lead deposits within the engine is entirely eliminated or greatly reduced.

I claim as my invention:

1. A supplementary anti-detonant fuel adapted for periodic introduction into a main hydrocarbon power fuel-air mixture and consisting essentially of from 3 to 6 cc. of tetraethyl lead per gallon of supplementary fuel, an aqueous solution consisting of from 80 to 95% by volume methanol and the balance water, and from 0.1 to 15 cc. per gallon of a compound selected from the group consisting of trimethyl phosphate and trimethyl phosphite.

2. A supplementary anti-detonant fuel adapted for periodic introduction into a main hydrocarbon fuel-air mixture and consisting essentially of 0.1 to 15 cc. of tetraethyl lead per gallon of the supplementary fuel, an aqueous alcohol solution consisting of 50 to 90% by volume monohydric alcohol containing 1 to 5 carbon atoms and 50 to 10% by volume of water, and from 0.1 to 15 cc. per gallon of the supplementary fuel of a compound selected from the group consisting of trimethyl phosphate and trimethyl phosphite, said tetraethyl lead being dissolved in the alcohol and the water content being insufficient to precipitate the tetraethyl lead.

3. A supplementary anti-detonant fuel adapted for periodic introduction into a main hydrocarbon power fuel-air mixture and consisting essentially of from 3 to 6 cc. tetraethyl lead per gallon of supplementary fuel, an aqueous alcohol solution consisting of 85% by volume of methanol and 15% by volume of water, and 3 cc. per gallon of supplementary fuel of a compound selected from the group consisting of trimethyl phosphate and trimethyl phosphite.

CARROLL H. VAN HARTESVELDT.

REFERENCES CITED

The following references are of record in the file of this patent:

UNITED STATES PATENTS

| Number | Name | Date |
| --- | --- | --- |
| 2,316,739 | Cook et al. | Apr. 13, 1943 |
| 2,404,094 | Robertson | July 16, 1946 |
| 2,427,173 | Withrow | Sept. 9, 1947 |
| 2,429,707 | Catalano | Oct. 28, 1947 |